United States Patent
Jain et al.

(10) Patent No.: US 8,818,426 B2
(45) Date of Patent: Aug. 26, 2014

(54) SCALABLE TRANSMISSION OR DEVICE TRIGGER REQUESTS

(71) Applicants: Puneet Jain, Hillsboro, OR (US); Meghashree Dattatri Kedalagudde, Hillsboro, OR (US); Muthaiah Venkatachalam, Beaverton, OR (US)

(72) Inventors: Puneet Jain, Hillsboro, OR (US); Meghashree Dattatri Kedalagudde, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 13/628,935

(22) Filed: Sep. 27, 2012

(65) Prior Publication Data

US 2013/0084894 A1   Apr. 4, 2013

Related U.S. Application Data

(60) Provisional application No. 61/542,726, filed on Oct. 3, 2011.

(51) Int. Cl.
*H04W 68/00* (2009.01)
*H04W 72/00* (2009.01)
*H04W 4/00* (2009.01)
*H04W 28/02* (2009.01)

(52) U.S. Cl.
CPC .......... *H04W 72/00* (2013.01); *H04W 28/0215* (2013.01); *H04W 4/005* (2013.01)
USPC ........ 455/458; 455/466; 455/422.1; 455/415; 455/141.1

(58) Field of Classification Search
CPC .... H04W 68/00; H04W 68/02; H04W 68/025
USPC .................... 455/458, 466, 422.1, 415, 414.1
See application file for complete search history.

(56) References Cited

U.S. PATENT DOCUMENTS

2011/0070900 A1*  3/2011  Shi et al. ................ 455/458
2014/0106792 A1*  4/2014  Bienas et al. ........... 455/458

* cited by examiner

*Primary Examiner* — Nghi H Ly
(74) *Attorney, Agent, or Firm* — Thorpe North & Western LLP

(57) ABSTRACT

Systems and methods for scalable triggering of machine type communication (MTC) devices are disclosed. One method comprises receiving for a selected period of time, at an MTC inter working function (IWF) module, a plurality of device trigger messages that are sent from a plurality of MTC servers. The plurality of device trigger messages are aggregated at the MTC IWF. A mobility management entity (MME) or Serving General Packet Radio Service (GPRS) Support Node (SGSN) for each device trigger message is identified. The aggregated device trigger messages are then sent to the identified MME or SGSN associated with each device trigger message to enable the identified MME SGSN to send the device trigger messages to a radio access network for transmission to the MTC devices.

17 Claims, 8 Drawing Sheets

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| List UE Paging Identity | | 1 | | | YES | ignore |
| >UE Paging Identity List Item | | 1 to <maxnoof UEs> | | | EACH | ignore |
| >> UE Paging Identity | M | | Figure 3 | | - | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to <maxnoof TAIs> | | | EACH | ignore |
| >>TAI | M | | 9.2.3.16 | | - | |
| CSG Id List | | 0..1 | | | GLOBAL | ignore |
| >CSG Id | | 1 to <maxnoof CSGId> | 9.2.1.62 | | - | |
| Paging Priority | O | | 9.2.1.78 | | YES | ignore |

FIG. 3a

| Range bound | Explanation |
|---|---|
| maxnoofTAIs | Maximum no. of TAIs. Value is 256. |
| maxnoofCSGIds | Maximum no. of CSG Ids within the CSG Id List. Value is 256. |
| maxnoofUEs | Maximum no. of UEs Value is 16 |

FIG. 3b

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| List UE Paging Identity | | 1 | | | YES | ignore |
| >UE Paging Identity List Item | | 1 to <maxnoof UEs> | | | EACH | ignore |
| >> UE Paging Identity | M | | Figure 3 | | - | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >UE Paging Identity List Item | | 1 to <maxnoof UEs> | | | EACH | ignore |
| > >UE Paging Identity | O | | Figure 3 | | - | ignore |
| >>TAI List Item | | 1 to <maxnoof TAIs> | | | EACH | ignore |
| >>>TAI | M | | 9.2.3.16 | | - | |
| CSG Id List | | 0..1 | | | GLOBAL | ignore |
| >CSG Id | | 1 to <maxnoof CSGId> | 9.2.1.62 | | - | |
| Paging Priority | O | | 9.2.1.78 | | YES | ignore |

FIG. 4a

| Range bound | Explanation |
|---|---|
| maxnoofTAIs | Maximum no. of TAIs. Value is 256. |
| maxnoofCSGIds | Maximum no. of CSG Ids within the CSG Id List. Value is 256. |
| maxnoofUEs | Maximum no. of UEs Value is 16 |

FIG. 4b

SCALABLE TRANSMISSION OR DEVICE TRIGGER REQUESTS

RELATED APPLICATIONS

This application claims the benefit of and hereby incorporates by reference U.S. Provisional Patent Application Ser. No. 61/542,726, filed Oct. 3, 2011, with an attorney docket number of P40031Z.

BACKGROUND

The concept of the Internet has been expanding into a more mobile Internet through the use of radio cellular technologies. An Internet of Things (IoT) is what some people envision to connect billions of physical or virtual devices in the Internet cloud. This enables these devices to exchange information not only among themselves but with the environments and servers that provide services to benefit the devices and end users. Although this concept seems simple, there are significant challenges in wirelessly communicating with billions of objects.

Wireless mobile services have been mainly designed for human communications that include both human-to-human and human-to-server communications. Human communications can include many devices, such as personal computers (PCs), notebooks, tablets, and smartphones, and such devices provide similar interfaces and services to users (e.g. video, voice, and multimedia). Such devices can be connected to a wireless network. Connecting physical devices to a wireless network can be relatively time consuming, and computationally and energy intensive relative to the use of network resources once a connection has been established. However, people typically connect to wireless networks infrequently, and for extended periods of time, often from several minutes to several hours per connection. Accordingly, the time and energy spent connecting is minimized in the overall scheme.

In contrast, the machine-to machine (M2M) communication market is comprised of a variety of services ranging from telemetry (e.g. smart meter, remote monitoring), to telematics (e.g. fleet tracking), to surveillance video. These M2M services and similar types of services have very different usage schemes. The devices can be configured to connect to a wireless network, upload information, and disconnect. The devices can connect more often, and for shorter periods of time than is typical with human communication.

In the example situation of a utility monitoring device, there may be a large group of wireless utility monitoring devices (e.g., 100-1000 devices) that may transmit information to a server within a short period of time.

In some situations, devices do not communicate as intended. When this occurs, a machine type communication (MTC) server may seek to reconnect to the devices to instruct the devices to communicate with the server. The connection of a large number of devices within this short period can strain the resources of the wireless network.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 3a and 3b illustrate a paging message format in accordance with an example;

FIGS. 4a and 4b illustrate a paging message format in accordance with an additional example;

Figure 1A:
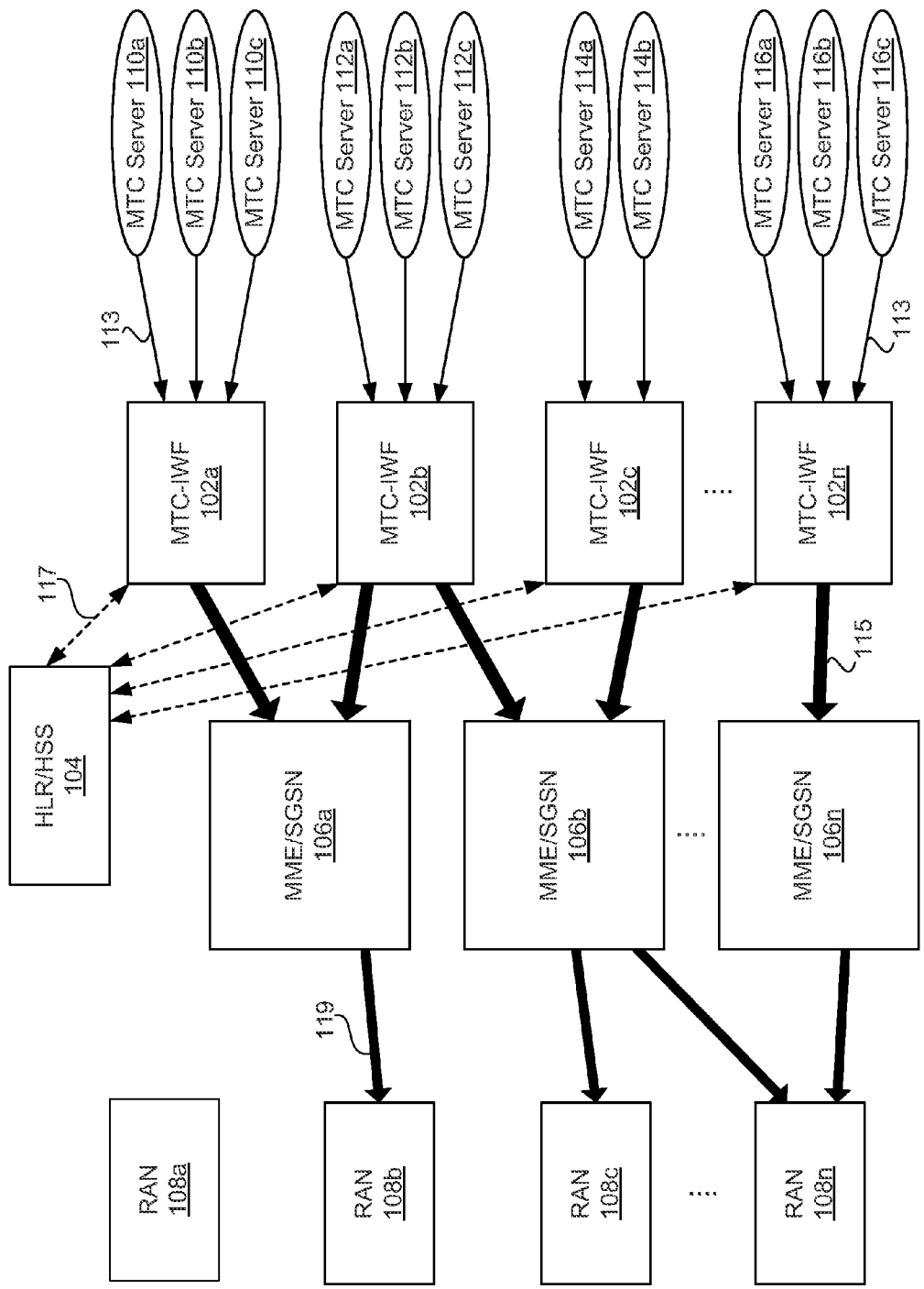
FIG. 1a illustrates a block diagram of a wireless network configuration of a scalable triggering mechanism for machine type communication (MTC) devices in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

For many machine to machine (M2M) applications there may be an interest to have a poll model for communications between machine type communication (MTC) devices and a server. As used herein, a server in communication with MTC devices is referred to as an MTC Server. Other names used for the MTC server include the Services Capability Server (SCS). The terms MTC server and SCS are considered to be synonymous. The terms MTC server and SCS are not intended to be limiting. Rather, they are examples of a server capable of polling MTC devices.

In a poll model, a server, such as the MTC server, can send a request to an MTC device. Upon receiving the request, the MTC device can send a response to the server. A poll model may be used to allow an MTC user or operator to be in control of communication with MTC Devices. Also for applications where MTC devices typically initiate communications, there may occasionally be a need for the MTC Server to poll data from the MTC devices.

If an MTC Server has an IP address available for the MTC device that it needs to poll data from, the MTC server can attempt to communicate with the MTC device using the IP address. If the communications fails, or if no IP address is available for the MTC device, the MTC Server can use an MTC device trigger to try to establish the communication. The use of an MTC device trigger can enable a packet data protocol (PDP)/packet data network (PDN) connection to be established with the MTC device if the connection did not previously exist. The PDP/PDN connection may also be re-established if it was not working properly. For instance, the MTC device trigger may be used to re-establish a PDP/PDN connection after an error condition in the network. The MTC device trigger can be configured such that MTC devices can typically only be triggered by an authorized MTC Server. If an authorized network is not able to trigger the MTC Device, due to problems or network congestion, the network may report the trigger failure to the MTC Server. The MTC server can then send an MTC device trigger to the non-responsive MTC device to re-establish a desired connection.

In one example embodiment, the MTC device trigger can be a service provided by a wireless network configured to operate under the third generation partnership project (3GPP) specification, such as the 3GPP LTE Release 8, 9, 10 or 11. In addition, other types of wireless specifications may also be used. For example, a cellular networking standard such as IEEE 802.16 standard, commonly referred to as WiMAX (worldwide interoperability for microwave access) may be used. Releases of the IEEE 802.16 standard include the IEEE 802.16e-2005, 802.16-2009, and 802.16m-2011. Releases of the 3GPP standard include the 3GPP LTE, Release 8 in the fourth quarter of 2008, 3GPP LTE Advanced Release 10 in the first quarter of 2011, and Release 11, which was pre-released in the first quarter of 2012.

While the term MTC is used to describe the communication of a wireless device in M2M communications, it is not intended to be limiting. An MTC device may be as simple as a transceiver connected to a processor, such as a wireless detector, monitor, or probe, or as complex as a mobile computing device such as a smart phone. The term MTC and UE are used interchangeably throughout the specification, unless otherwise noted. As used herein, an MTC device is any device configured to autonomously communicate with another computing device using wireless communications.

Triggering of MTC devices is based on the use of an identifier identifying the MTC device that needs to be triggered. In one embodiment, an identifier used by the MTC user in the triggering request to the MTC server can be different from the identifier used by the MTC server in the triggering request sent to the public land mobile network (PLMN).

A scalable communication scheme can be used to minimize the amount of wireless network resources needed to connect to and communicate with a large number of devices in a relatively short period of time. The trigger mechanism can be able to provide a scalable transmission of trigger request and trigger response messages for multiple MTC devices in the public land mobile network and on the interfaces with an MTC server.

In one example embodiment, a scalable mechanism can be used to trigger multiple machine type communication (MTC) devices at once from an MTC server. This can reduce the number of messages used to trigger MTC devices, especially between the MTC and an eNodeB, and between a mobility management entity (MME) or Serving General Packet Radio Service (GPRS) Support Node (SGSN) and an MTC-Inter Working Function (IWF) interface. The MTC device trigger can be communicated by the MTC server via control plane signaling.

An IWF interface can include both the hardware and software elements that provide the rate adaptation and protocol conversion between a public switched telephone network (PSTN) and a wireless network. Some systems require more IWF capability than others, depending on the network to which the IWF is being connected. The IWF provides the function to enable the 3GPP system to interface with the various forms of public and private data networks currently available. The basic features of the IWF can include data rate adaption and protocol conversion.

FIG. 1a provides one example of a configuration that provides a scalable triggering mechanism for machine type communication (MTC) devices. In the figure, arrays of network devices are provided similar numbering with lettering added to distinguish individual devices of a similar type. In this specification, when the lettering is not included it is intended to refer to all of the devices. For example, "n" RANs are illustrated, labeled 108a-n. All of the RANs may also be referred to simply using the label "108".

In the example of FIG. 1a, an MTC server, such as MTC server 110a, can send one or more MTC device trigger messages 113 to an MTC-IWF, such as MTC-IWF 102a. One or more MTC servers can communicate with each MTC-IWF. For example, MTC-IWF 102a is in communication with MTC servers 110a-c; MTC IWF 102b is in communication with MTC servers 112a-c; MTC IWF 102c is in communication with MTC server 114a-b; and MTC-IWF 102n is in communication with MTC servers 116a-c. This example is not intended to be limiting. Each MTC-IWF can communicate with dozens, or hundreds of MTC servers, depending on system demand and the system architecture. Each MTC device trigger can include a communication to an MTC device that instructs the MTC device to communicate with the MTC server. The communication can also include specific instructions, such as a type and amount of information for the MTC device to return to the MTC server. Alternatively, the MTC device trigger can merely be used to establish a connection between the MTC server and the MTC device, thereby enabling other devices on the wireless network to communicate with the MTC device.

Figure 1B:
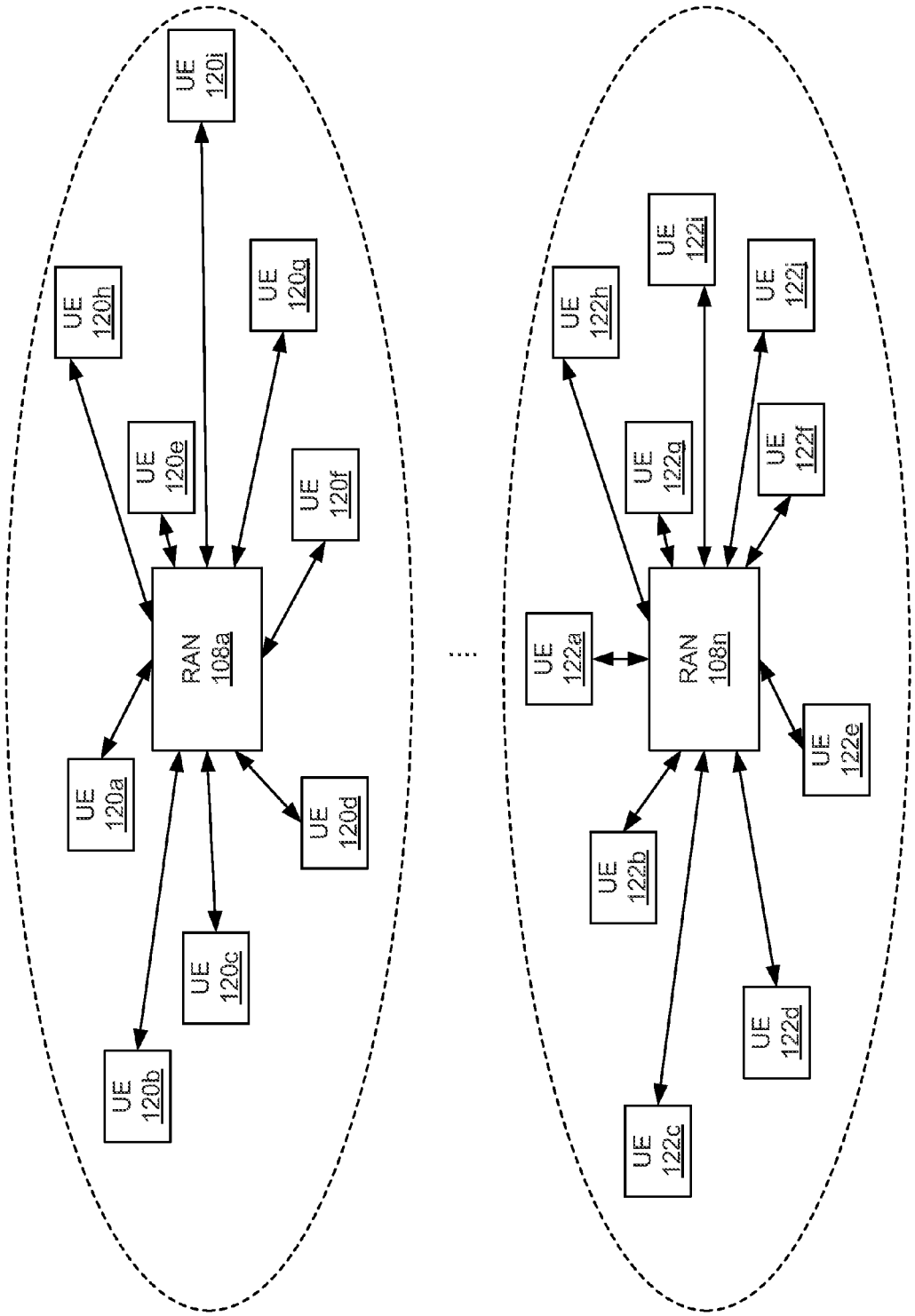
FIG. 1b illustrates a block diagram of a radio access network in communication with the wireless network configuration of FIG. 1a in accordance with an example.

The configuration illustrated in FIG. 1a continues in FIG. 1b, showing the RANs 108a-n that are each in communication with a plurality of UEs. The UEs can all be MTC devices. Alternatively, some UEs may be MTC devices and some may be UEs that are not configured to function as an MTC device. The MTC devices can receive communication from the RAN via one or more nodes, such as eNodeBs configured as one or more macro nodes or low power nodes operating within the RAN. This will be discussed more fully in the proceeding paragraphs.

If MTC servers 110-116 continuously output MTC device trigger messages 113 to one or more radio access networks (RAN) 108a-n, the continuous flow of messages could tax the RAN's ability to wirelessly communicate the trigger message to the MTC devices since a near continuous string of pages would be needed to communicate the messages. In addition, each page may contain limited information about one or just a few MTC device trigger messages.

In order to reduce the load on the RAN 108a-n, and other devices within the network, the MTC device trigger messages 113 from the MTC servers 110-116 can be aggregated at the MTC-IWF 102a-n for a selected period of time. In one embodiment, a trigger aggregation module (TAM) 222 (FIG. 2a, 2b) can operate on each MTC-IWF 102a-n. A separate TAM may be configured to operate at each MTC-IWF. Alternatively, a TAM may be in communication with each MTC-IWF 102a-n in the network. Upon receiving an MTC device trigger message from an MTC server, the TAM can start an aggregation timer. Until the expiry of the timer, the TAM can aggregate all of the MTC device triggers that are received from the MTC servers that are in communication with the MTC-IWF.

The length of the selected period of time during which the MTC device trigger messages 113 are aggregated at each MTC-IWF 102a-n can be set by a system operator based on system operating conditions. The selected time period may be set automatically or manually. For instance, if a load on a wireless network is relatively high, the aggregation time can be set to be longer to reduce the number of pages used to communicate MTC device trigger messages. If the load on a wireless network is relatively low, the aggregation time can be set to be shorter to take advantage of unused network capability. If the load on the network is sufficiently low, the selected period of time can be set to zero to allow the MTC device trigger messages to be directly communicated to a RAN 108a-n without aggregation.

Each MTC device trigger message 113 can include information regarding an external device identification (ID) used to identify an MTC device. In one example, the external device ID can be a uniform resource identifier (URI), although other types of formats may be used for the external device ID.

Each MTC-IWF 102a-n can be in communication with one or more radio system-fixed network interfaces 106a-n. In the example illustrated in FIG. 1a, each radio system-fixed network interface is referred to as being at least one of a mobility management entity (MME) and a Serving General Packet Radio Service (GPRS) Support Node (SGSN). The radio system-fixed network interface is referred to in the proceeding paragraphs as an MME for the sake of brevity, but this is not intended to be limiting. The radio system-fixed network interface can also be an SGSN, or another design configured to interface between a radio system and a fixed network.

When an MTC device trigger message 113 is received at an MTC-IWF 102, the MTC-IWF, such as MTC-IWF 102a, can use the external device ID, such as the URI, to obtain location information that can be used to locate the MME and the RAN that is in communication with the MTC device to which the MTC device trigger message was sent by the MTC server 110a. In one example embodiment, a home location register (HLR) operating on a home subscriber server (HSS) can maintain a mapping of the external device ID of each MTC device to location information, such as a device international mobile subscriber identity (IMSI) and other routing information. The mapping may be maintained as part of subscription information for each MTC device. Upon receiving a query 117 from the MTC-IWF that includes the external device ID, the HLR/HSS 104 can identify and communicate the IMSI value and routing information for the MTC device associated with the MTC device trigger message back to the MTC-IWF that sent the query.

In one embodiment, the TAM 222 operating on each MTC-IWF 102a-n can aggregate all of the external device IDs (such as the URI) that are received from the multiple MTC trigger messages 113 from one or more MTC servers 110-116 for a selected period of time. A single query message 117 can then be sent to the HLR/HSS 104 that includes the external device IDs of the aggregated MTC trigger messages. The HLR/HSS can send a single response 117 that includes the IMSI and other routing information for each of the MTC trigger messages that were aggregated during the selected period of time. In one embodiment, a query can be sent to the HLR/HSS each time the aggregation timer expires. The HLR/HSS can also include information regarding the MME associated with each of the MTC devices for which an MTC device trigger message is destined.

The TAM 222 operating on each MTC-IWF 102a-n can then group the MTC device trigger messages 113 received from the MTC servers 110-116 based on the destination MME of the MTC device trigger message. The MTC-IWF can then send a device trigger delivery request 115 to each MME that services one or more MTC devices for which an MTC device trigger message was received. The device trigger delivery request can include the list of MTC device entities received as a parameter from the TAM.

Each MME 106a-n can receive aggregated MTC device trigger messages 115 from the MTC-IWF. In one embodiment, the MME can perform further processing such as further aggregation or de-aggregation of the MTC device trigger messages. For example, the MTC device trigger messages may be aggregated (i.e. grouped) based on the tracking area in which the MTC device is located that will receive an MTC device trigger message. For instance, a TAM 224 (FIG. 2a, 2b) operating on the MME can be configured to aggregate the MTC device trigger messages of all of the UEs that belong to the same tracking area(s) in a single paging message. Alternatively, triggers belonging to multiple tracking areas may be communicated. This will be discussed more fully in the proceeding paragraphs.

FIG. 1b provides an example illustration of the RANs 108a-n that are in communication with a plurality of UEs 120a-l; 122a-l, respectively. Each MME can send a paging request 119 (FIG. 1a) to its associated RAN that includes a list of UE identities. Each RAN can then send a page that includes a list of paging records. The MTC device trigger messages can be delivered to the appropriate MTC device (i.e. UE) via the paging message broadcast by the eNodeB in the RAN. The ability to transmit multiple paging records in a single page provides a more efficient use of the RAN and reduces the number of paging messages needed to communicate the MTC device trigger messages from the MTC servers.

Returning to FIG. 1a, the example architecture illustrated provides flexibility in the communication of the MTC device trigger messages 113 from the MTC server 110-116 to the UE 120, 122. Each MTC server can be assigned to communicate with a selected MTC-IWF 102a-n. However, each MTC-IWF can aggregate the MTC device trigger messages based on the MME associated with the MTC device designated to receive a trigger message. For instance, MTC-IWF 102b is illustrated providing aggregated MTC device trigger messages 115 to both MME 106a and MME 106b. Each MME can then aggregate the device trigger messages based on the RAN associated with the MTC device to which the MTC device trigger message is designated. In this example, MME 106b is illustrated delivering aggregated MTC device trigger messages 119 to both RAN 108c and RAN 108n.

Figure 2A:
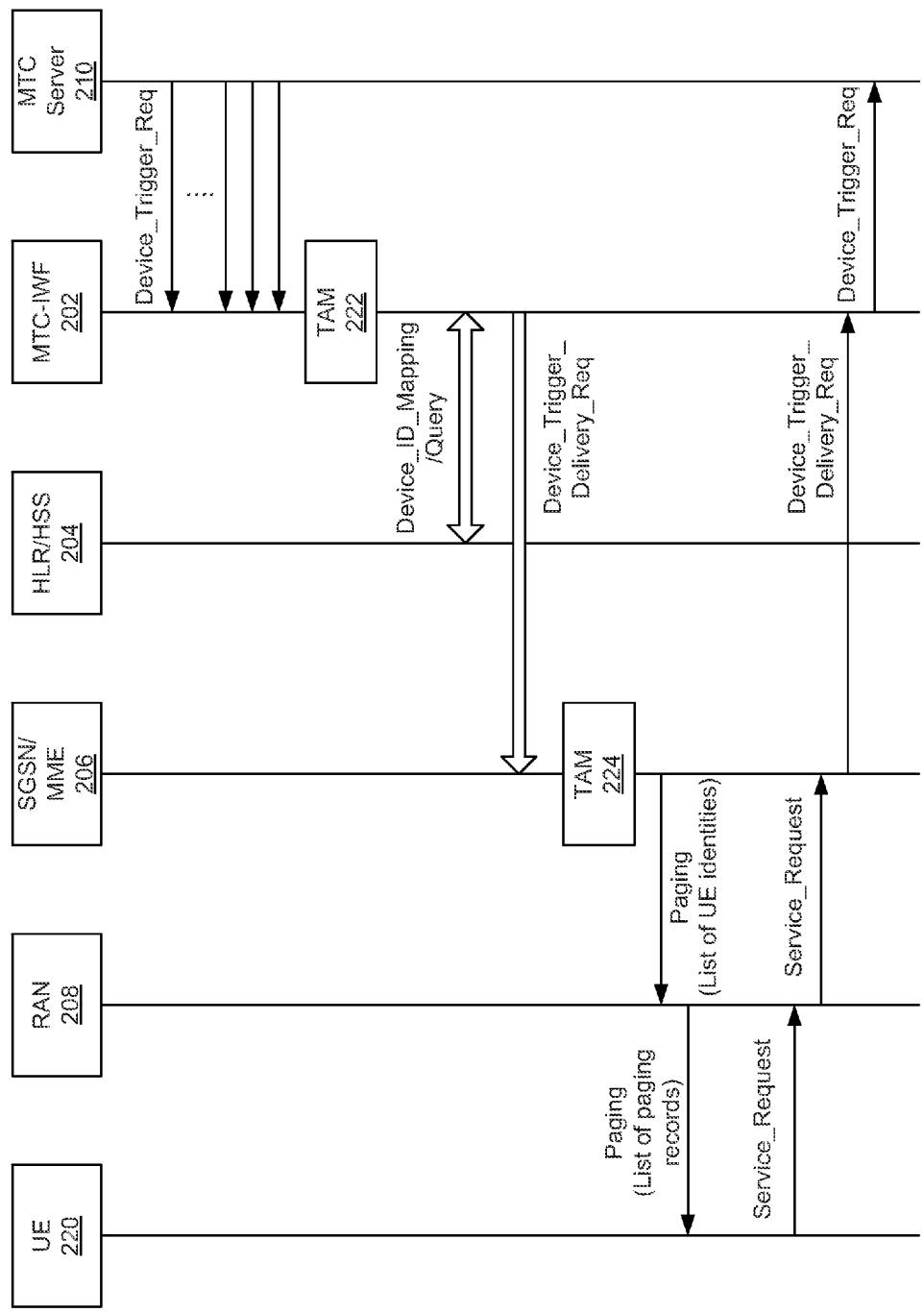
FIG. 2a illustrates a flow diagram of messages communicated in the scalable triggering mechanism configuration in accordance with an example.
Figure 2B:
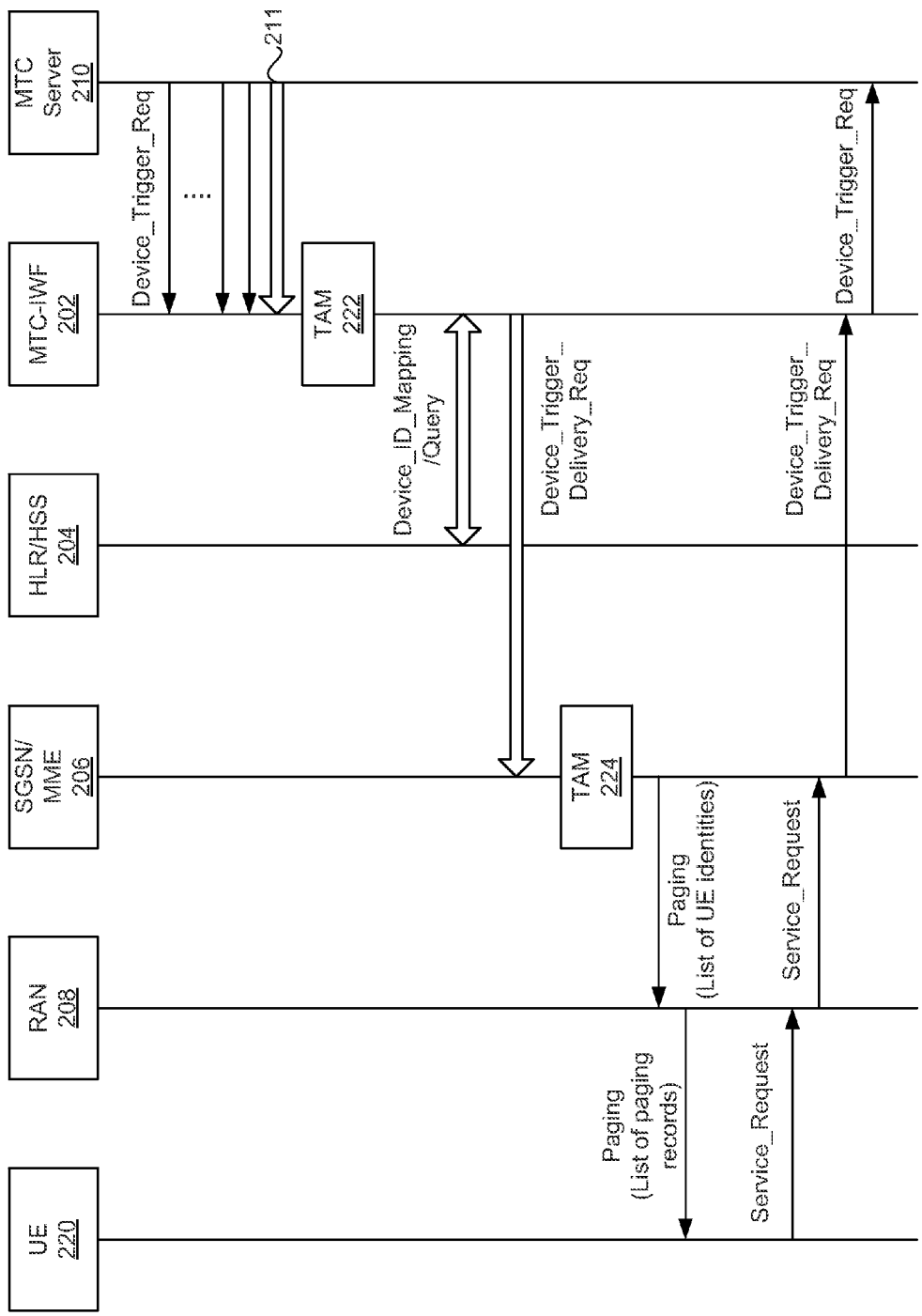
FIG. 2b illustrates an additional flow diagram of messages communicated in the scalable triggering mechanism configuration in accordance with an example.

FIG. 2a provides an example flow diagram for the architecture of FIG. 1a and 1b. In the example of FIG. 2a, a plurality of MTC device trigger requests are sent from the MTC server 210 to the MTC-IWF 202. The plurality of MTC device trigger requests are aggregated by the TAM 222 at the MTC-IWF. A device ID Mapping and query message is then sent to the HLR/HSS 204. As previously discussed, a device ID and routing information can be communicated form the HLR/HSS to the MTC-IWF for each MTC device trigger request. The device ID and routing information may be sent individually for each device, or may be aggregated for a selected period of time. The selected period of time can be equal to the period of time during which the device trigger requests are aggregated by the TAM 222 at the MTC_IWF. Alternatively, the selected period of time may be shorter or longer than the aggregation timer.

A device trigger delivery request for the aggregated MTC device trigger requests can then be sent from the MTC IWF 202 to an MME 206. The MTC device trigger requests can be aggregated based the mapping information so that they are delivered to the MME that is associated with the MTC device(s) destined to receive the MTC device trigger request(s).

A TAM 224 operating at the MME 206 can then de-aggregate and/or re-aggregate the plurality of MTC device trigger requests. While only aggregated messages are illustrated as being sent from the MTC-IWF to the MME, it is also possible to send single device trigger request messages, or multiple aggregated device trigger request messages to the MME. The TAM 224 can then re-assemble the device trigger request messages as desired. For example, as previously discussed, the MTC device trigger messages received from the MTC-IWF 202 can be aggregated (i.e. grouped) based on the tracking area in which the MTC device is located that will receive an MTC device trigger message. The TAM 224 operating on the MME can be configured to aggregate the MTC device trigger messages of all of the UEs that belong to the same tracking area(s) in a single paging message so that they are delivered to the RAN 208 that is associated with the MTC device(s) destined to receive the MTC device trigger request(s). A paging request is sent from the MME 206 to the RAN that includes a list of UE identities. The TAM can also be used to de-aggregate and/or re-aggregate any type of single MTC device trigger messages and/or aggregate device trigger messages to place the aggregate messages in a desired grouping, as can be appreciated.

When an eNodeB receives a paging message from an MME, the eNodeB will notify the UEs by paging. The eNodeB can put multiple "UE identity received over S1-AP messages" inside a Paging RecordList in a paging message communicated over the air interface. The Paging RecordList can include a list of PagingRecords with the UE identities all of the UEs to which the paging message is addressed. One example of a paging message that is configured to be communicated from the eNodeB to the UE is defined in the 3GPP TS 36.331 V10.5.0 (2012-03).

In the example of FIG. 2a, a paging request is then sent from the eNodeB in the RAN 208 to the UE 220. The paging request can include a list of paging records. The UE can receive the appropriate paging record that includes the MTC device trigger request for the UE (i.e. MTC device).

Upon receiving an MTC device trigger request, a UE 220 can communicate a service request message to the RAN 208. The RAN can forward the service request message to the MME 206. The MME can send a device trigger delivery request message to the MTC-IWF 202, which can then communicate a device trigger request to the appropriate MTC server 210 to allow the MTC server to know that the MTC device trigger request was received by the MTC device (UE).

The device trigger request can include information to allow a communication link to be formed between the UE and the wireless network to allow the UE to communicate with the network, and vice versa.

FIG. 2a provides an example in which the MTC server 210 sends multiple device trigger requests for selected MTC devices to the MTC-IWF 202. In another embodiment, illustrated in FIG. 2b, the MTC server can also send an aggregated device trigger request itself to the MTC-IWF. The aggregated device trigger request 211 is illustrated by the wider arrow from the MTC server. The aggregated device trigger request may be a request from the MTC server to trigger a range of MTC devices with a single request. The aggregated device trigger request can be forwarded on by the MTC-IWF 202 to the MME 206, as previously discussed. Alternatively, the aggregated device trigger request may be further aggregated by the TAM 222 at the MTC-IWF 202 with other single or aggregated device trigger requests from one or more MTC servers.

In a 3GPP LTE network, the location of a UE/MTC device in idle state is known by the network based on a tracking area granularity. When paging a UE, the evolved packet core (EPC) of the LTE network indicates a geographical area that is translated within an evolved Universal Terrestrial Radio Access Network (E-UTRAN) to the actual cells that are to be paged. A "geographical area" could be a tracking area or a list of tracking areas. The MME is configured to initiate the paging procedure by sending the paging message to each eNodeB with cells belonging to the tracking area(s) in which the UE is registered. Each eNodeB can contain cells belonging to different tracking areas, whereas each cell can only belong to one tracking area.

A tracking area identity (TAI) is the identity used to identify tracking areas. In one embodiment, the TAI is constructed from the Mobile Country Code (MCC), the Mobile Network Code (MNC) and the Tracking Area Code (TAC). At the reception of a paging message, the eNB can perform paging of the UE in cells which belong to tracking areas as indicated in an information element containing a List of TAIs.

A specified paging message format and UE paging identity may be used when communicating the aggregated MTC device trigger messages from the MME and RAN. For example, in one embodiment, the paging message format and UE paging identity, as defined in 3GPP TS 36.413 V10.5.0 (2012-03), can be used.

In one embodiment, a paging message can be used wherein the MTC device trigger messages are sent to multiple UEs in the same tracking area. When the MME 206 receives aggregated trigger messages from the MTC-IWF 202, the MME can send a paging message to one or more RAN(s) 208 with a list of UE identities that belong to the same tracking areas.

An example paging message format is illustrated in FIG. 3a. In addition to the standard information for a paging message that is specified in the 3GPP TS 36.413, the paging message can also include an information element (IE) providing information about the UEs within a selected tracking area. As shown in FIGS. 3a and 3b, a UE paging identity list item can be included that has a range from 1 to a maximum number of UEs. FIG. 3b identifies that the maximum number of UEs in this example is 16, although this is not intended to be limiting. A UE paging identity is mandatory in this information element, as illustrated with the presence of "M". A presence of "O" infers an optional presence in the information element. The IE type and reference refers to sections of the 3GPP TS 36.413 specification.

Thus, the additional information included in the example paging message illustrated in FIGS. 3a and 3b allows a list of UE identities to be included that belong to the same tracking area. This allows the MTC device trigger message to be communicated, via the paging message, to multiple UEs in the same tracking area(s).

In another embodiment, MTC device trigger messages can be communicated to multiple UEs in different tracking areas. In this example, when the MME 206 receives aggregated trigger messages from the MTC-IWF 202, the MME can send a paging message with a list of UE identities, and the list of tracking areas that each UE belongs to.

An example paging message format to allow the MTC device trigger messages to be communicated to multiple UEs in different tracking areas is provided in FIGS. 4a and 4b. In addition to the UE paging identity list provided in FIG. 3a, an optional UE paging identity list item is included under the list of TAIs.

This allows the tracking area (TAI) of each UE in the paging identity list to be tracked; thereby enabling the MTC device trigger messages to be sent to multiple UEs in different tracking areas.

Figure 5:
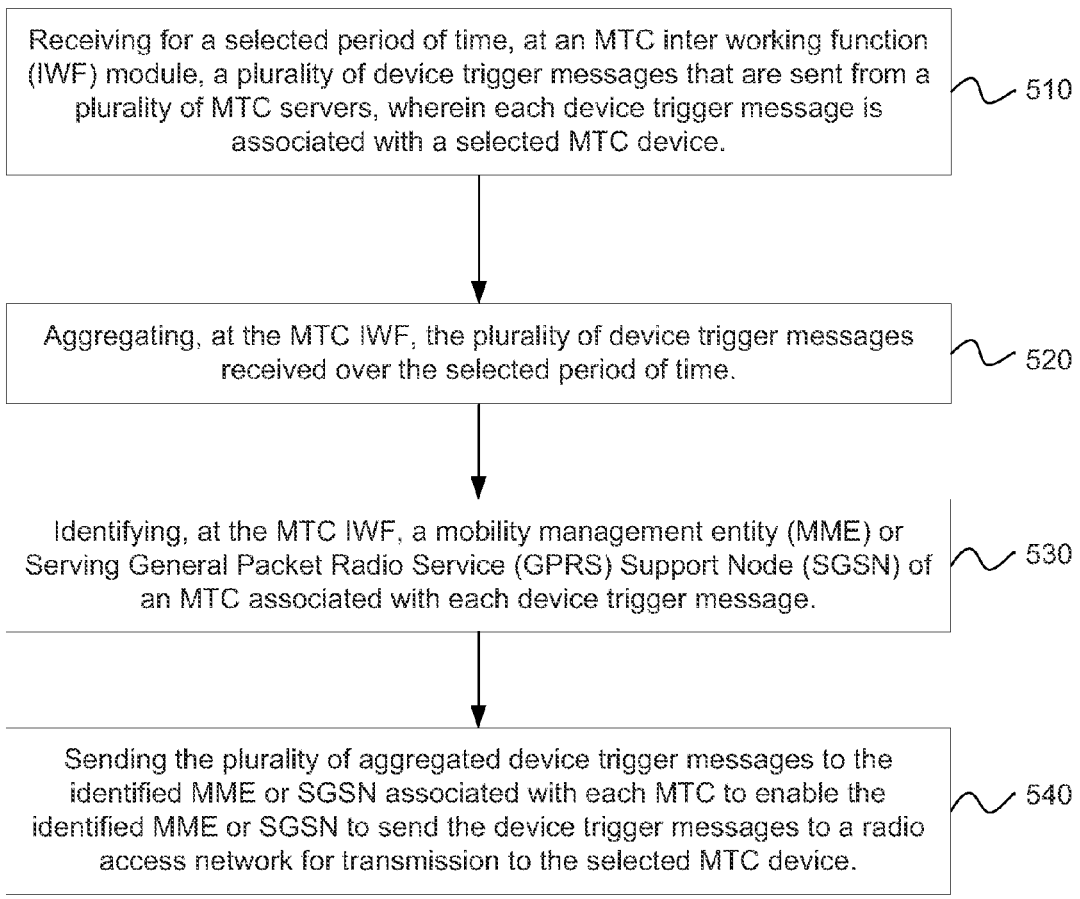
FIG. 5 depicts a flow chart of a method for scalable triggering of machine type communication (MTC) devices in accordance with an example.

In accordance with one example embodiment, a method 500 for scalable triggering of machine type communication (MTC) devices is disclosed, as depicted in FIG. 5. The method comprises the operation of receiving, for a selected period of time, at an MTC interworking function (IWF) module, a plurality of device trigger messages that are sent from a plurality of MTC servers, as shown in block 510. Each device trigger message is associated with a selected MTC device. The plurality of device trigger messages that are received at the MTC IWF during the selected period of time can be aggregated, as shown in block 520. A mobility management entity (MME) or a Serving General Packet Radio Service (GPRS) Support Node (SGSN) of an MTC that is associated with each device trigger message is identified, at the MTC IWF, as shown in block 530. The plurality of aggregated device trigger message are sent to the identified MME or SGSN that is associated with each MTC to enable the identified MME or SGSN to send the device trigger messages to a radio access network (RAN) for transmission to the selected MTC device, as shown in block 540.

In one embodiment, the method 500 further comprises aggregating the plurality of device trigger messages for the length of an aggregation timer. The operation of identifying an MME can further comprise the operations of: receiving an external device identification (ID) associated with each device trigger message; sending a query to a home location register (HLR) on a home subscriber server (HSS) for the external device ID; and receiving, at the MTC IWF, an international mobile subscriber identity (IMSI) based on the external device ID from the HSS; aggregating the external device IDs received at the MTC IWF for a period of time; sending a single query for the aggregated external device IDs to the HSS; receiving, at the MTC IWF, an IMSI for each external device ID from the HSS; and mapping, at the HSS, the external ID of each MTC with an IMSI.

In another embodiment, the method 500 further comprises the operation of grouping the trigger device messages at the MTC IWF based on a destination MME of each trigger device message. A device trigger delivery request can be sent from the MTC-IWF to identified MME for each trigger device message. Wherein the device trigger delivery request includes an international mobile subscriber identity (IMSI) used to identify each MTC device.

Figure 6:
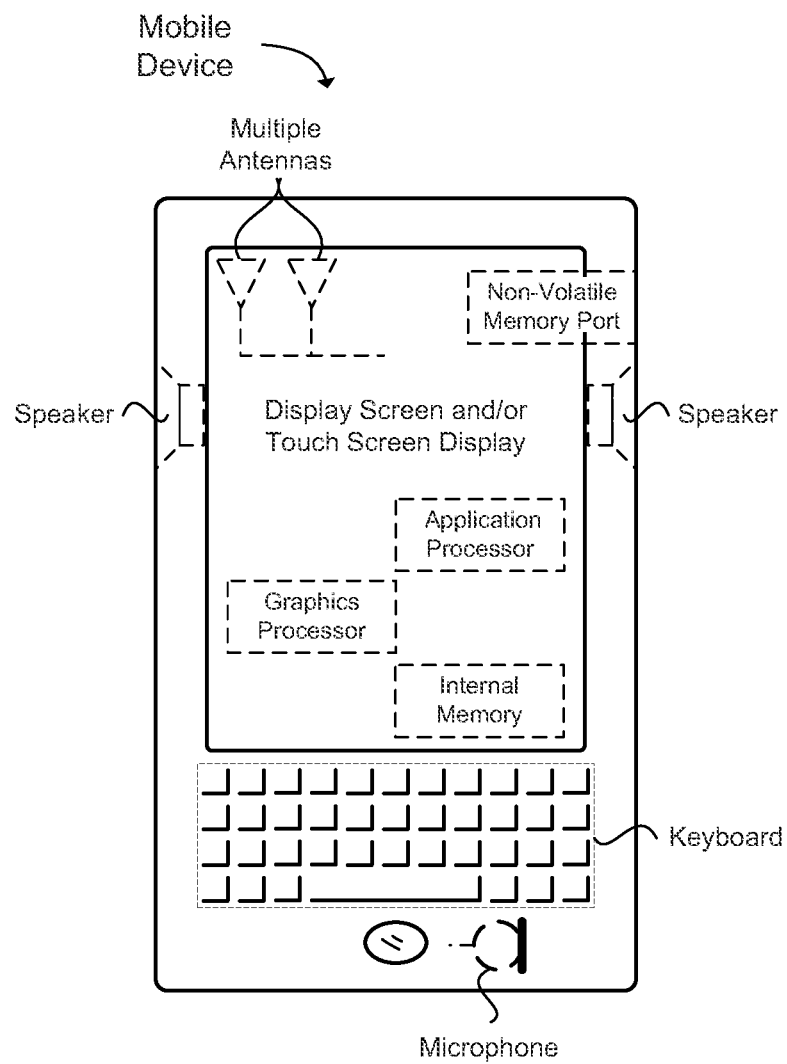
FIG. 6 illustrates a mobile wireless device in accordance with an example.

FIG. 6 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 6 also provides an illustration of a microphone and one or more speakers that can be used for audio input and output from the mobile device.

The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A scalable triggering mechanism for machine type communication (MTC) devices, comprising:
   a trigger aggregation module (TAM) configured to operate on a radio system fixed network interface, wherein the TAM is configured to:
   receive an aggregate device trigger message containing a plurality of MTC device trigger messages and a user equipment (UE) identity for each MTC device trigger message; and
   communicate a paging message to at least one radio access network (RAN) with a list of the UE identities contained in the aggregate device trigger message to enable the RAN to communicate a paging message with a list of paging records to each identified UE.

2. The scalable triggering mechanism of claim 1, wherein the radio system fixed network interface is at least one of a mobility management entity (MME) and a Serving General Packet Radio Service (GPRS) Support Node (SGSN).

3. The scalable triggering mechanism of claim 1, wherein the TAM is configured to receive a service request from at least one identified UE that receives the paging message and communicate a device trigger acknowledgement to an MTC server that sent the MTC device trigger for the at least one identified UE.

4. The scalable triggering mechanism of claim 1, wherein the TAM is further configured to receive at least one single MTC device trigger message and aggregate the at least one single MTC device trigger message with other single MTC device trigger messages or with the aggregate device trigger message.

5. The scalable triggering mechanism of claim 1, wherein the TAM is further configured to:
   sort the list of the UE identities into tracking areas; and
   communicate the paging message, wherein the paging message includes a list of UE identities belonging to a same tracking area.

6. The scalable triggering mechanism of claim 1, wherein the TAM is further configured to:
   communicate the paging message, wherein the paging message includes a list of UE identities and a list of tracking areas that each identified UE belongs to.

7. The method of claim 1, further comprising grouping the trigger device messages at the MTC IWF based on a destination MME or SGSN of each trigger device message.

8. The method of claim 1, further comprising sending, from the MTC-IWF a device trigger delivery request to the identified MME or SGSN for each trigger device message, wherein the device trigger delivery request includes an international mobile subscriber identity (IMSI) used to identify each MTC device.

9. The method of claim 1, further comprising:
   receiving, at the MME or SGSN, at least two aggregated device trigger messages;
   de-aggregating the at least two aggregated device trigger messages to form a plurality of device trigger messages; and
   re-aggregating the plurality of device trigger messages based a tracking area of each device trigger message to enable the re-aggregated device trigger message to be communicated in a single paging message.

10. A non-transitory machine readable storage medium comprising a plurality of instructions adapted to be executed to implement the method for scalable triggering of machine type communication (MTC) devices, comprising:
    receiving an aggregate trigger message at a radio system-fixed network interface, wherein the aggregate trigger message contains a plurality of MTC device trigger messages and a user equipment (UE) identity for each MTC device trigger message; and
    communicating a paging message from the radio system-fixed network interface to at least one radio access network (RAN) with a list of the UE identities contained in the aggregate device trigger message to enable the RAN to communicate a paging message with a list of paging records to each identified UE.

11. The method of claim 10, further comprising receiving the aggregate trigger message at the radio system-fixed network interface, wherein the radio system-fixed network interface is at least one of a mobility management entity (MME) and a Serving General Packet Radio Service (GPRS) Support Node (SGSN).

12. The method of claim 10, wherein receiving the aggregate trigger message further comprises receiving the aggregate trigger message from an MTC inter working function (IWF), wherein the IWF is configured to:
- receive an external device identification (ID) associated with each device trigger message;
- send a query to a home location register (HLR) on a home subscriber server (HSS) for the external device ID;
- receive, at the MTC IWF, an international mobile subscriber identity (IMSI) based on the external device ID from the HSS; and
- send the IMSI for each device trigger message in the aggregate trigger message to the radio system-fixed network interface.

13. The method of claim 10, further comprising receiving a service request from at least one identified UE that receives the paging message and communicating a device trigger delivery response to an MTC server that sent the MTC device trigger for the at least one identified UE.

14. The method of claim 10, further comprising:
- sorting the list of the UE identities into tracking areas; and
- communicating the paging message from the radio system-fixed network interface to the RAN, wherein the paging message includes a list of UE identities belonging to a same tracking area to enable the RAN to send the paging records to UEs in a selected tracking area.

15. The method of claim 10, further comprising communicating the paging message from the radio system-fixed network interface to the RAN, wherein the paging message includes a list of UE identities and a list of tracking areas to which each identified UE belongs to, to enable the RAN to send the paging records to each identified UE in a tracking area to which the UE is located.

16. The method of claim 10, further comprising sending the paging message, wherein the paging message includes a single tracking area to which the UE identities contained in the aggregate device trigger message belong.

17. The method of claim 10, further comprising sending the paging message, wherein the paging message includes the list of UE identities and a list of tracking areas in which each UE in the list of UE identifies belongs.

* * * * *